US011415476B2

(12) United States Patent
Ardaiz Usoz et al.

(10) Patent No.: US 11,415,476 B2
(45) Date of Patent: Aug. 16, 2022

(54) PRESSURE AND TEMPERATURE MEASURING DEVICE WITH IMPROVED FLUID FLOW CONTROL

(71) Applicant: CEBI ELECTROMECHANICAL COMPONENTS SPAIN, S.A., Villatuerta (ES)

(72) Inventors: Ignacio Ardaiz Usoz, Villatuerta (ES); Lesmes Nicolas Haro, Villatuerta (ES); Sergio Diez Garcia, Villatuerta (ES)

(73) Assignee: CEBI ELECTROMECHANICAL COMPONENTS SPAIN, S.A., Villatuerta (ES)

( * ) Notice: Subject to any disclaimer, the term of this patent is extended or adjusted under 35 U.S.C. 154(b) by 372 days.

(21) Appl. No.: 16/804,724

(22) Filed: Feb. 28, 2020

(65) Prior Publication Data

US 2020/0284680 A1 Sep. 10, 2020

(30) Foreign Application Priority Data

Mar. 4, 2019 (ES) .............................. ES201930349U (51) Int. Cl.
*G01L 19/00* (2006.01)
*G01K 1/22* (2006.01)
*G01D 11/24* (2006.01)

(52) U.S. Cl.
CPC ............ *G01L 19/0092* (2013.01); *G01K 1/22* (2013.01); *G01L 19/0038* (2013.01); *G01D 11/245* (2013.01)

(58) Field of Classification Search
None
See application file for complete search history.

(56) References Cited

U.S. PATENT DOCUMENTS

| 8,256,279 | B2 * | 9/2012 | Siegenthaler | ........... G01L 23/10 |
| | | | | 73/114.16 |
| 8,935,961 | B2 * | 1/2015 | Papadeas | .............. G01L 19/147 |
| | | | | 73/714 |
| 2014/0005569 | A1 * | 1/2014 | Miethke | .............. G01L 19/0046 |
| | | | | 72/347 |

FOREIGN PATENT DOCUMENTS

ES 1217768 U 9/2018

* cited by examiner

*Primary Examiner* — Brandi N Hopkins
*Assistant Examiner* — Nigel H Plumb
(74) *Attorney, Agent, or Firm* — Lucas & Mercanti, LLP (57) ABSTRACT

A pressure and temperature measuring device with improved fluid flow control having a metal bulb that houses a temperature-sensitive element and a base with an orifice for the passage of fluid and tabs that project from the base, extending outside a plastic body, and an axial seal positioned between the conduit and the orifice; with the base of the metal bulb facing the plastic body, with the conduit and the orifice aligned to allow the passage of fluid, with the axial seal compressed axially.

8 Claims, 9 Drawing Sheets

PRESSURE AND TEMPERATURE MEASURING DEVICE WITH IMPROVED FLUID FLOW CONTROL

CROSS REFERENCE TO RELATED APPLICATION

This application claims the benefit of priority of Spanish Patent Application No. U201930349, filed on Mar. 4, 2019, which is incorporated herein by reference.

TECHNICAL FIELD

The present invention relates to the measurement of the pressure and temperature of fluids in sectors such as the automotive and industrial sectors and for use in applications such as fuel filters, combustion engines, cooling circuits, air conditioning, etc., proposing a measuring device of this type which encompasses the functions of pressure measurement and temperature measurement in a single unit, with an embodiment with advantageous constructive and functional features.

BACKGROUND OF THE INVENTION

In the automotive sector, industrial sector and others, there are functionalities that require the temperature and pressure of fluids in circuits of different applications to be controlled, there being measuring devices that allow these functions to be carried out effectively.

However, in many cases, it is becoming necessary to integrate the temperature and pressure measurement functions into a single device, in order to achieve application systems that are more compact, easier to install and less expensive.

For this purpose, measuring devices have been developed that include a temperature-sensitive element, such as an NTC (Negative Temperature Coefficient), which is a resistor with a negative temperature coefficient with respect to the variation of its resistance, and a pressure sensor made up of a ceramic capacitive element.

In one embodiment of said measuring devices, such as the one described in U.S. Pat. No. 8,935,961 B2, the temperature-sensitive element is positioned in a plastic body, in which said element is housed in a hollow space, from which electrical wires run to connect the temperature-sensitive element to an electronic circuit, to which a connector is in turn attached to connect the measuring device to the application system, with the electrical wires passing through hollow conduits defined in the plastic body.

With this arrangement, due to the nature of the constructive solution, it is very difficult to incorporate thermal pastes to facilitate heat transmission from the fluid to be controlled to the temperature-sensitive element, which reduces efficacy, speed and accuracy of the measurement of the temperature with the measuring device.

In addition, the aforementioned embodiment involves the complex manufacture and assembly of components of the measuring device, such as the plastic body that houses the temperature-sensitive element, due to the hollow spaces that have to be made in said plastic body to house the temperature-sensitive element and to run the wires, which increases the manufacturing cost of the aforementioned plastic body, in addition to increasing the likelihood of defects therein.

Also, the subsequent assembly of the temperature-sensitive element in the plastic body is also highly complex and makes it difficult for the construction process of the measuring device to be automated.

In another known embodiment, the temperature-sensitive element and the electrical connection cables to the electronic circuit are housed in a plastic body overmoulded onto them. With this arrangement, since the temperature-sensitive element is overmoulded in the plastic body that houses it, it is not possible to incorporate thermal pastes to facilitate heat transmission from the fluid to be controlled to the temperature-sensitive element, which also reduces the effectiveness of the temperature measurement.

In this case, the overmoulded body also creates additional complexity in the manufacturing process of the measuring device, increasing the cost of production and the percentage of defects that may appear in the housing of the temperature-sensitive element; while in the assembly process the temperature-sensitive element is susceptible to accidental shocks and contacts that could cause it to deteriorate.

Another pressure and temperature measuring device is disclosed in Utility Model ES1217768U, which is registered to the same holder of this invention, featuring a plastic body comprising a central cylinder with the temperature-sensitive element protruding from the free end. To protect this temperature-sensitive element, a metal bulb is coupled to said central cylinder.

To prevent fluid from entering the metal bulb, where the pressure-sensitive element is positioned, the device comprises a watertight seal, which is inserted in a slot in the central cylinder. The manufacture of this plastic body, with slots in the central cylinder, is complex and leaves defects and/or mould joint marks in said grooves, so watertightness is not completely guaranteed.

Moreover, the elements that connect the temperature-sensitive element to the electronic circuit are overmoulded onto said plastic body. This configuration can lead to breakage of said connection elements when there are temperature variations, due to expansion or contraction of the elements, produced by said temperature variations.

In view of all of these disadvantages and limitations of the conventional solutions for measuring devices that together include the temperature measurement function and the pressure measurement function, it is therefore necessary to develop a solution that facilitates the construction and assembly process, without detriment to the functional performance, of said measuring devices.

SUMMARY OF THE INVENTION

The present invention proposes a measuring device for controlling fluids, including a temperature measurement function and a pressure measurement function in the same mounting assembly, with a series of embodiment features that advantageously solve the disadvantages and limitations of the measuring devices of this type that currently exist.

This pressure and temperature measuring device object of the invention comprises a temperature-sensitive element, a pressure-sensitive element, an electronic circuit to which the temperature-sensitive element and the pressure-sensitive element are connected, a connector that has terminals for connection to the electronic circuit, a plastic body in which the temperature-sensitive element is arranged, which comprises a conduit for the passage of fluid, an external housing body that is coupled to the connector, wherein the measuring device additionally comprises a metal bulb, where the temperature-sensitive element is housed, with the metal bulb comprising a base that has an orifice for the passage of fluid and tabs, which project from the base, which extend outside the plastic body to couple to it, and an axial seal, positioned in correspondence with the conduit and the orifice, such that, when the device is mounted, the base of the metal bulb is facing the plastic body, with the conduit and the orifice also aligned to allow the passage of fluid, and with the axial seal compressed axially.

With this configuration, absolute watertightness in the passage of the fluid through the orifice in the base of the metal bulb and the conduit in the plastic body is achieved thanks to the axial seal, which is compressed axially in correspondence between said conduit and said orifice.

Also, to ensure said watertightness, the plastic body includes a recess in correspondence with said conduit, which, as it is configured, avoids the presence of defects and/or mould joint marks in the recess resulting from the manufacture of the plastic body, such that the axial seal positioned in said recess provides absolute watertightness.

The metal bulb associated as a single piece with the base is left facing the plastic body after it has been mounted, possesses great structural rigidity and generates a more reliable and robust functional assembly than the alternatives of known measuring devices in which the temperature-sensitive element is incorporated into a plastic body on which a protective bulb of said temperature-sensitive element is attached.

In addition, with this embodiment object of the invention, there are no overmoulded elements that connect the temperature-sensitive element to the electronic circuit, which reduces manufacturing costs and avoids possible breakage of the elements due to expansion or contraction thereof due to temperature variations. Also, in this configuration there are no welds, so assembly is very simple and is perfectly automatable, and it also avoids all of the problems associated with welds, such as collateral thermal damage, contamination and lack of robustness of the joint against thermal shocks.

The nature of the metal bulb forming a unit with its base also minimises the contact of the fluid to be controlled by the measuring device with plastic elements, which minimises potential degradation and unwanted chemical reactions, preventing the harmful consequences thereof.

The functional assembly of the measuring device results, with this embodiment of the invention, in complete metal encapsulation, which provides complete and effective electrical shielding that favours the protection of the functional elements.

In addition, the plastic body has longitudinal notches on its outer periphery, into which the tabs that project from the base of the metal bulb fit, which allows simpler radial positioning of the base of the metal bulb such that the conduit and the orifice are aligned. In addition, this configuration also makes it possible to reduce the diametrical dimensions of the device.

In addition, the tabs have widths that are different from each other, in correspondence with different widths of the longitudinal notches of the plastic body, such that there is a single radial position in which the metal bulb is arranged on the plastic body by means of fitting of the tabs into the notches, in which position the conduit of the plastic body and the orifice of the base of the metal bulb are aligned.

Also, the metal bulb is selected from among a series of metal bulbs of different lengths, since the arrangement thereof in the assembly allows an adaptation of the length as necessary depending on the applications of the measuring device, incorporating a longer or shorter metal bulb from a series of metal bulbs planned for manufacture, without compromising the robustness and rigidity of the functional assembly.

Likewise, the free ends of the tabs are bent over a plate that holds the pressure-sensitive element against the plastic body, making it possible to obtain a pre-assembled functional assembly. This thereby results in a measuring device that facilitates the constructive formation process, since a functional assembly that can be factory-assembled into a common assembly for all applications is obtained, which can be adapted to any intended application of the measuring device by changing only the external housing, the connector and the electronic circuit, which also results in a lower cost.

In addition, this pre-assembled arrangement of the functional assembly allows for watertightness testing and calibration of said functional assembly, without the need to have the entire measuring device mounted in its final arrangement for the intended application, which makes it possible to reduce the cost associated with defects that may appear in the assembly of the aforementioned functional assembly.

For all of this, the recommended measuring device is the result of a series of constructive and functional features that make it advantageous, giving it a life of its own and making it preferential with respect to the conventional measuring devices with same function.

DETAILED DESCRIPTION OF THE INVENTION

The object of the invention discloses a temperature and pressure measuring device for controlling fluids, integrating into the same mounting assembly a temperature-sensitive element (1), which may be, for example, an NTC sensor, and a pressure-sensitive element (2), which may be, for example, a ceramic cell, with both elements being connected to an electronic circuit (3), to which the terminals (4) of a connector (5) for connecting the measuring device are also connected to the application system for which it is used.

The temperature-sensitive element (1) is housed in a metal bulb (6), which has a base (7) that has an orifice (24) through which fluid is allowed to pass so that the fluid can come into contact with the pressure-sensitive element (2). Also, on said base (7), several tabs (8) project frontally, such that in the constructive assembly of the measuring device, said tabs (8) pass longitudinally through the outside of a plastic body (9) and are coupled to it, preferably by bending the free ends of the tabs (8).

The pressure-sensitive element (2) is positioned in said plastic body (9), comprising a conduit (16) to allow the fluid to come into contact with the pressure-sensitive element (2).

An axial seal (23) is positioned in correspondence between the conduit (16) of the plastic body (9) and the orifice (24) in the base (7) of the metal bulb (6), such that when the device is mounted, the axial seal is axially compressed and prevents the leakage of the fluid that passes between the conduit (16) and the orifice (24).

Preferably, the plastic body (9) includes a recess (25) in correspondence with the conduit (16), in which the axial seal (23) is positioned, such that when the device is mounted, the axial seal (23) is axially compressed in said recess (25). The manufacture of the plastic body (9) with the recess (25) leaves no defects or mould joint marks in the recess (25). Consequently, the watertightness in the measuring device is fully guaranteed.

In the case of Utility Model ES1217768U, the configuration is different, since the metal bulb is coupled to a central cylinder that protrudes from the plastic body, with a radially-compressed seal established between said central cylinder and the metal bulb. Due to the manufacture of said central cylinder with notches, which produces mould joint marks thereon, watertightness is not properly guaranteed. However, in the device object of the invention, no marks of any kind are created, and watertightness is fully guaranteed by the axial seal (23) positioned in the recess (25) of the plastic body (9).

Moreover, the device object of the invention comprises an external housing body (12) which closes with the connector (5), with all of the elements of the device contained therein. The free end of the metal bulb (6) is positioned inside the free end of the housing body (12), such that the fluid enters through the housing body (12), coming into contact with the metal bulb (6). Moreover, in order for the temperature of the fluid in contact with the metal bulb (6) to better reach the temperature-sensitive element (1), a thermal paste can be applied between the temperature-sensitive element (1)

Moreover, the device comprises a plate (10) which holds the pressure-sensitive element (2) against the plastic body (9). It is possible to bend the free ends of the tabs (8) on this plate (10), such that the tabs surround the plastic body (9) and the plate (10).

Preferably, the plastic body (9) comprises several longitudinal notches (13) on its outer periphery, into which the tabs (8) that project from the base (7) of the metal bulb (6) may be housed. This allows simpler and more effective radial alignment of the conduit (16) of the plastic body (9) and the orifice (24) of the base (7), so that the fluid correctly reaches the pressure-sensitive element (2). Moreover, this configuration also makes it possible to reduce the diametrical dimension of the device.

Even more preferably, the tabs (8) have widths that are different from each other, in correspondence with different widths of the longitudinal notches (13) of the plastic body (9), such that there is a single radial position in which the metal bulb (6) is arranged on the plastic body (9) by means of fitting of the tabs (8) into the notches (13). This therefore ensures that the metal bulb (6) is mounted on the plastic body (9) such that the conduit (16) of the plastic body (9) and the orifice (24) of the base (7) are aligned.

Figure 1:
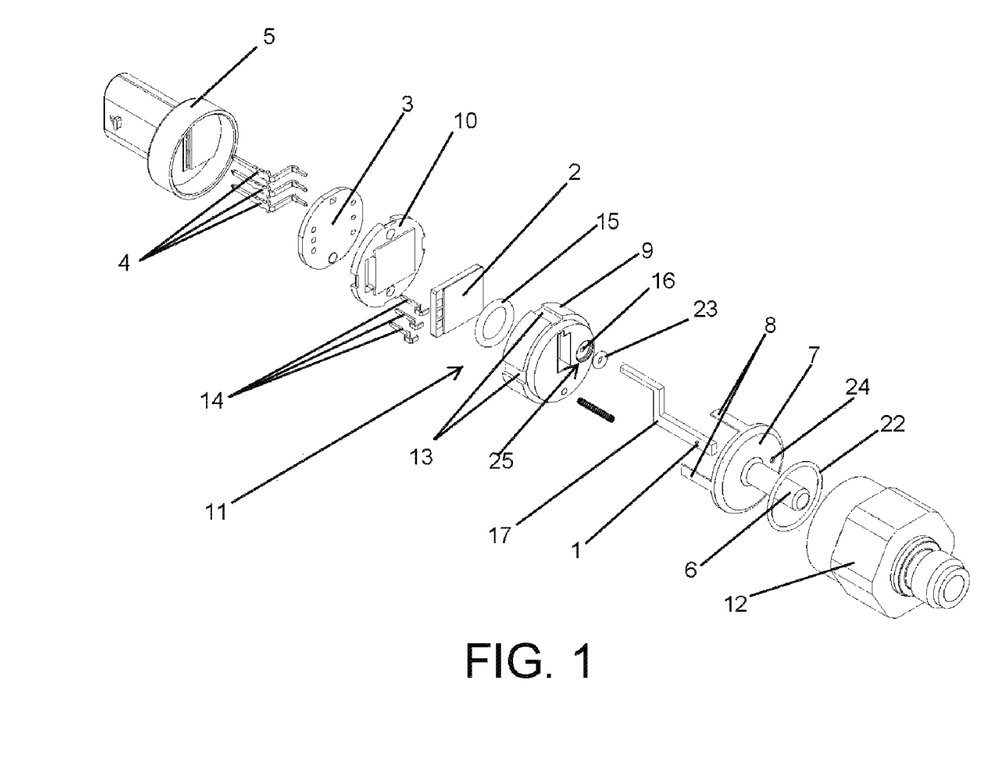
FIG. 1 shows in exploded perspective view of an exemplary embodiment of a temperature and pressure measuring device according to the object of the invention.
Figure 2:
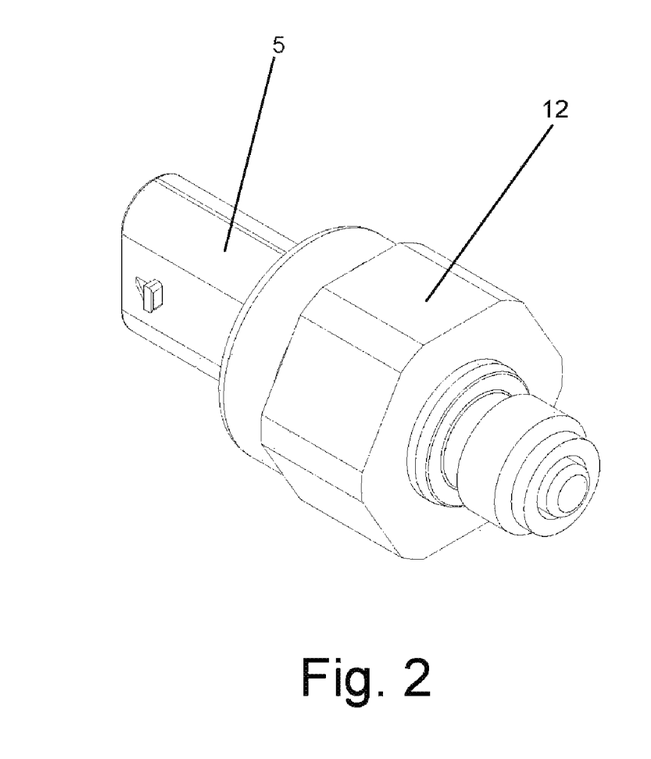
FIG. 2 is a perspective view of the assembled measuring device.
Figure 3:
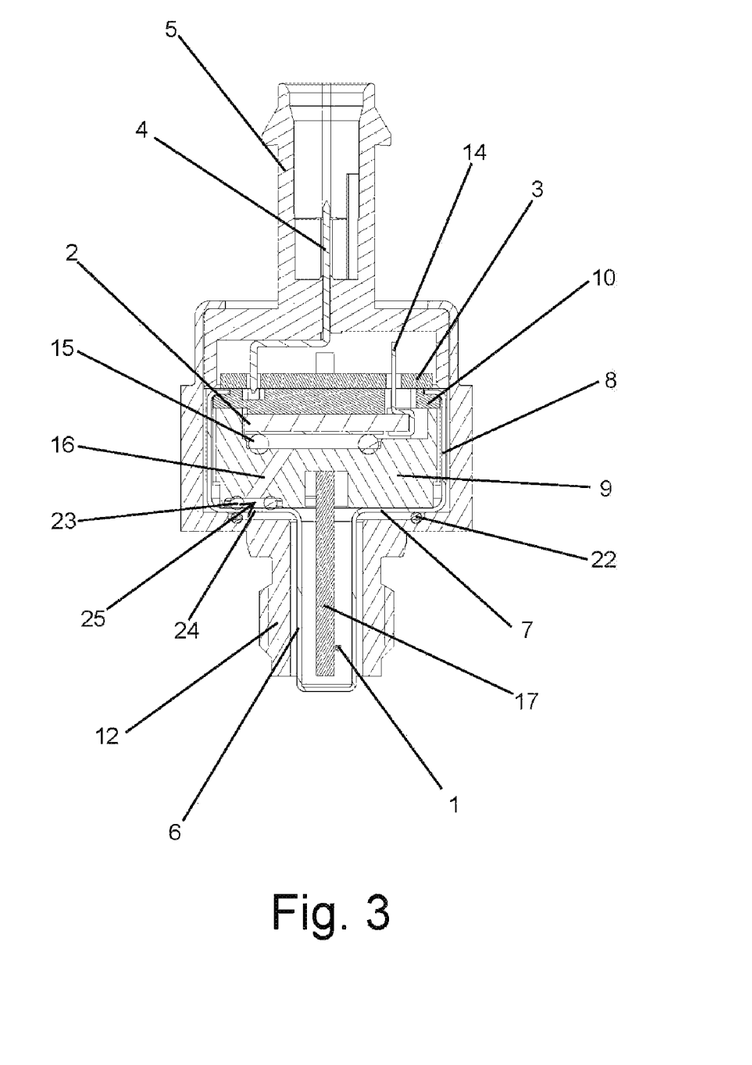
FIG. 3 is a longitudinal cross-section view of the assembly of the assembled measuring device.
Figure 4:
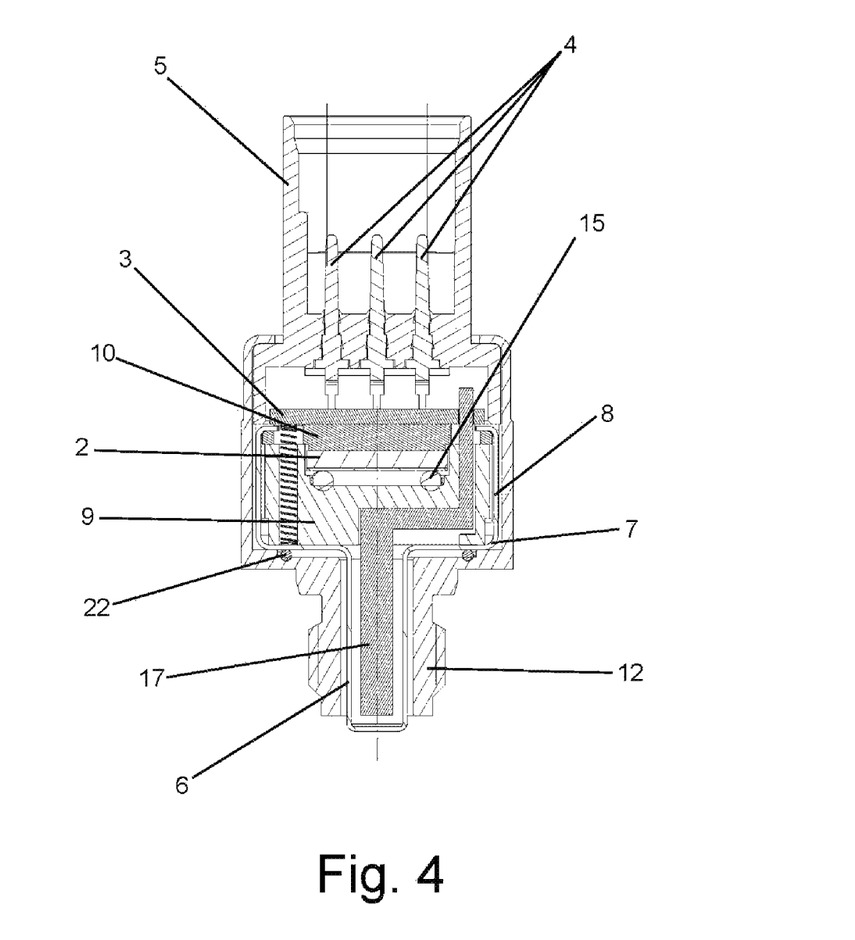
FIG. 4 is a longitudinal cross-section view of the measuring device cut by a plane perpendicular to the plane in the previous figure.
Figure 5:
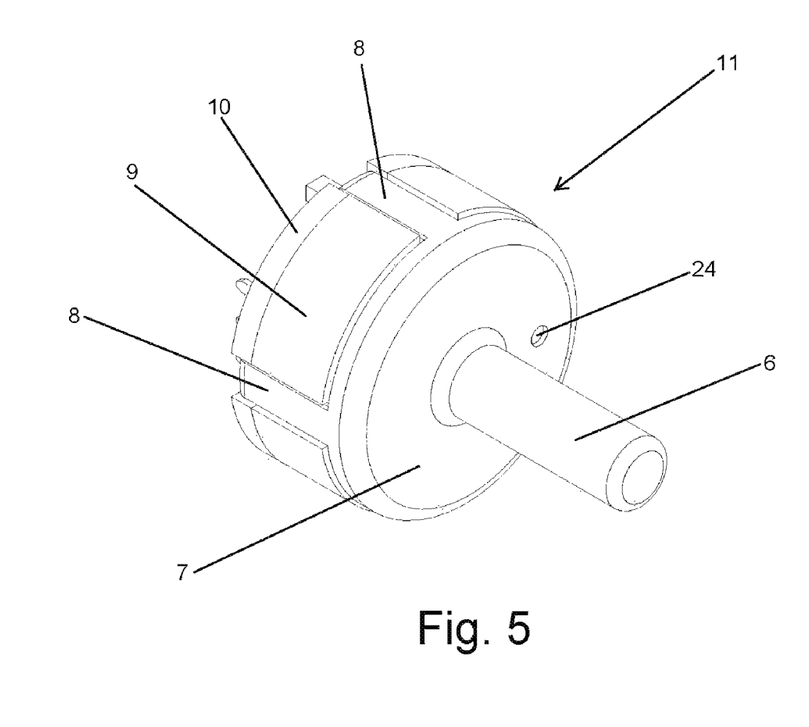
FIG. 5 is a perspective view of an assembled functional assembly of the measuring device.
Figure 6:
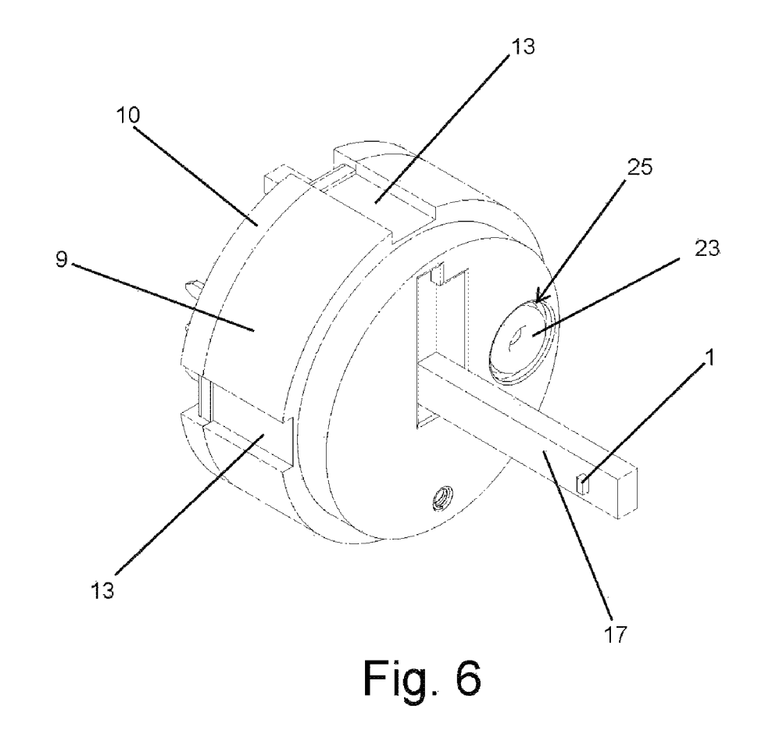
FIG. 6 is a perspective view of a plastic body of the functional assembly of the measuring device, with an embodiment of the temperature-sensitive element in the mounting arrangement in said plastic body.
Figure 7A:
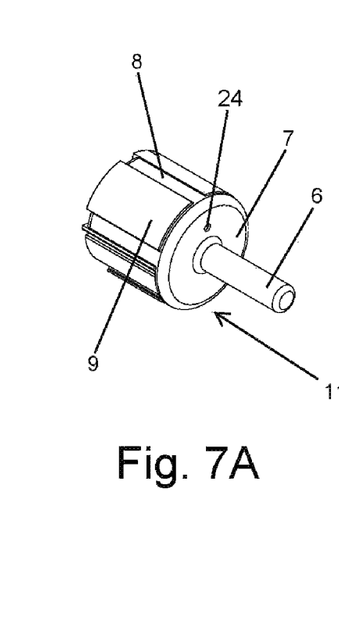
FIGS. 7A, 7B and 7C show three embodiments of the functional assembly of the measuring device with the metal bulb with three different respective lengths.
Figure 7B:
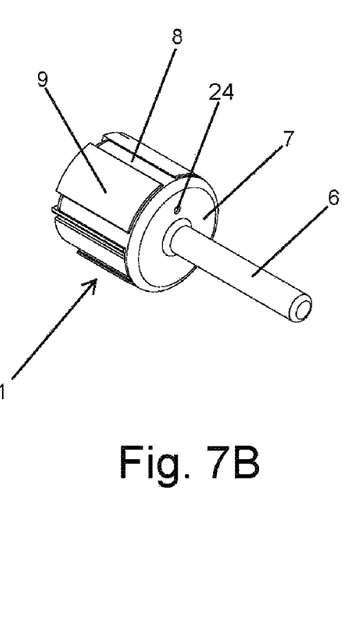
Figure 7C:
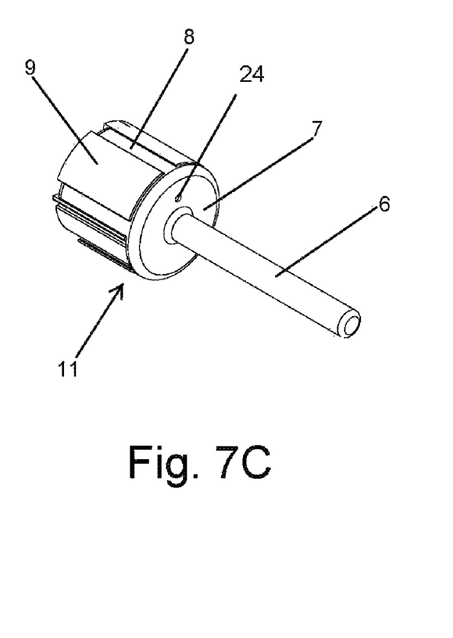

In addition, as shown in FIGS. 7A, 7B and 7C, the device object of the invention can be adapted according to the applications for which it is intended, incorporating a longer or shorter metal bulb (6) as required to better sense the temperature of the fluid to be controlled, a series of metal bulbs (6) of different lengths have been planned for this purpose, to be incorporated, selectively, in the assembly of the measuring device.

The electrical connection of the pressure-sensitive element (2) with respect to the electronic circuit (3) can be established, for example, by means of rigid terminals (14), with this solution not being limiting in nature, with said pressure-sensitive element (2) being supported on the plastic body (9) by means of an O-ring seal (15) around the opening of the conduit (16) through which the thrust of the fluid to be controlled by the measuring device is transmitted to the aforementioned pressure-sensitive element (2).

The mounting of the metal bulb (6) in the housing body (12) is provided with a sealing ring (22) which is compressed axially by the base (7) of the metal bulb (6) against the back of the interior housing of said housing body (12) in the assembly of the measuring device, thereby achieving a perfect watertight barrier that prevents any possible leakage of the fluid that is controlled with the measuring device in the application use.

According to one embodiment, as shown in FIGS. 1 to 6, the temperature-sensitive element (1) is incorporated by surface welding into a printed circuit (17), which extends to the electronic circuit (3) to which it connects.

Figure 8:
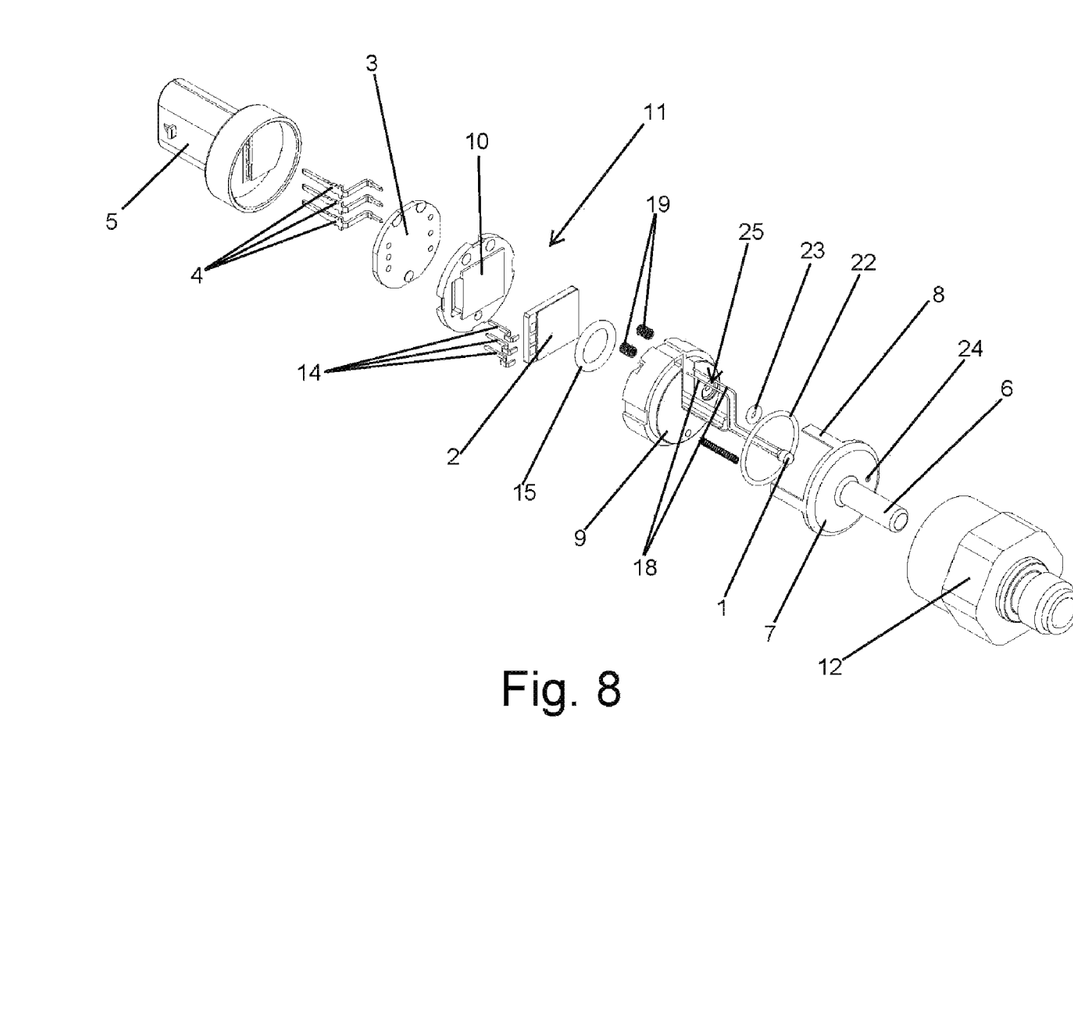
FIG. 8 is an exploded perspective view of the measuring device with the temperature-sensitive element according to another exemplary embodiment.

Said embodiment is not limiting in nature, being able to use other embodiments that have effect within the same concept of the invention, such as the one shown in FIG. 8, with the temperature-sensitive element (1) attached to electrical wires (18), which extend to connect with the electronic circuit (3), and with the possibility of establishing said connection, either by direct contact of the electrical wires (18) with the electronic circuit (3), or by means of connecting springs (19).

Figure 9:
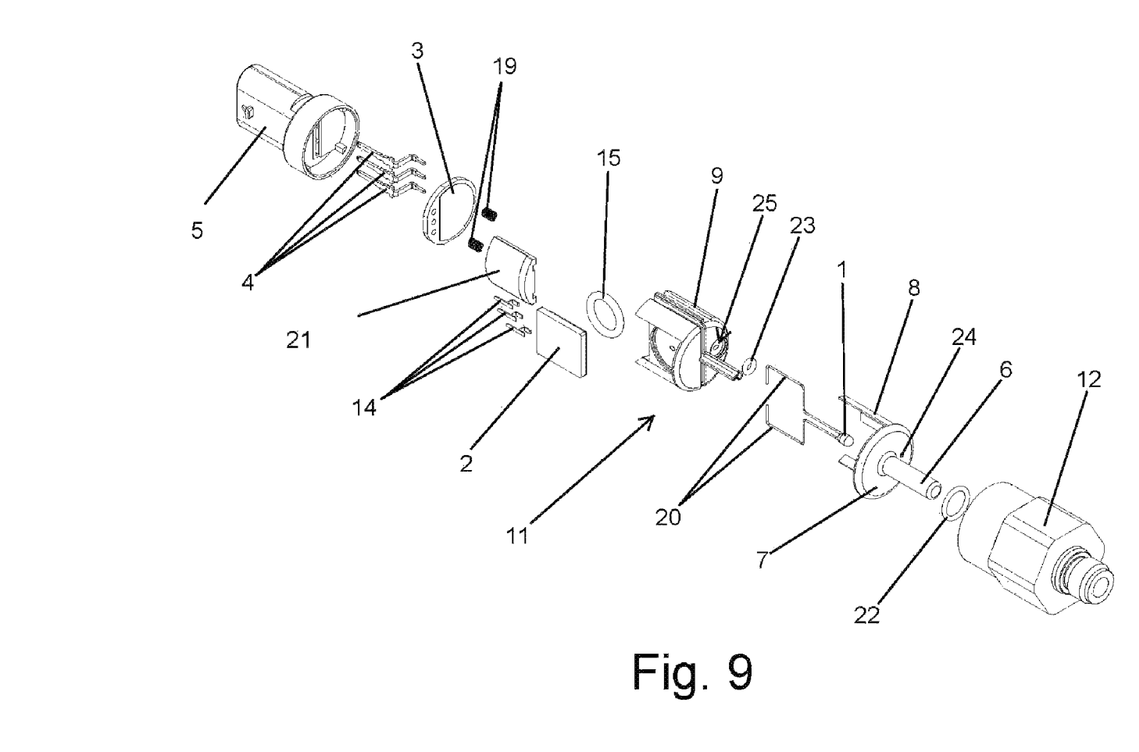
FIG. 9 is an exploded perspective view of the measuring device with the temperature-sensitive element according to a third exemplary embodiment.

Another possible embodiment that also fulfils the objective of the invention is the one shown in FIG. 9, with the temperature-sensitive element (1) also provided with electrical wires (20), which establish a connection with the electronic circuit (3), and the pressure-sensitive element (2) arranged laterally, supported radially on the plastic body (9), with a thrust piece (21) in that direction.

The electrical wires (18, 20) are formed by conductive metal wires that are covered by respective insulating sleeves.

In this invention, the elements that connect the temperature-sensitive element (1) to the electronic circuit (3); in this case the printed circuit (17) or the electrical wires (18) and (20), are not overmoulded on the plastic body (9), as is the case with the Utility Model ES1217768U, which prevents possible breakage of the elements of the measuring device when there are changes in temperature and the different elements expand or contract.

Once the tabs (8) that project from the base (7) of the metal bulb (6) are bent on the plastic body (9) (or onto the assembly of the plastic body (9) and the plate (10)), this invention makes it possible to obtain a functional assembly (11) which can be supplied pre-assembled at the factory, to be incorporated into a final assembly, into a specific housing body (12), with a specific connector (5) and with a specific electronic circuit (3), selected according to each specific intended application of the measuring device.

The invention claimed is:

1. A pressure and temperature measuring device comprising
- a temperature-sensitive element,
- a pressure-sensitive element,
- an electronic circuit to which the temperature-sensitive element and the pressure-sensitive element are connected,
- a connector that has terminals for connection to the electronic circuit,
- a plastic body in which the temperature-sensitive element is arranged, comprising a conduit for the passage of fluid,
- an external housing body that is coupled to the connector,
- wherein the device additionally comprises a metal bulb, where the temperature-sensitive element is housed, with the metal bulb comprising a base that has an orifice for the passage of fluid and tabs, which project from the base, which extend outside the plastic body to couple to it,
- and an axial seal, positioned in correspondence with the conduit and the orifice,
- such that, when the device is mounted, the base of the metal bulb is facing the plastic body, with the conduit and the orifice also aligned to allow the passage of fluid, and with the axial seal compressed axially.

2. The pressure and temperature measuring device, according to claim 1, wherein the plastic body comprises a recess in correspondence with the conduit, in which the axial seal is positioned.

3. The pressure and temperature measuring device, according to claim 1, wherein the plastic body has longitudinal notches on its outer periphery, through which the tabs pass, which allows simpler radial positioning of the base of the metal bulb such that the conduit and the orifice are aligned for the correct passage of the fluid.

4. The pressure and temperature measuring device, according claim 3, wherein the tabs have widths that are different from each other, in correspondence with different widths of the longitudinal notches of the plastic body, such that there is a single radial position in which the metal bulb is arranged on the plastic body by means of fitting of the tabs into the notches.

5. The pressure and temperature measuring device, according to claim 1, wherein the metal bulb is selected from among a series of metal bulbs of different lengths.

6. The pressure and temperature measuring device, according to claim 1, wherein the free ends of the tabs are bent over a plate that holds the pressure-sensitive element against the plastic body, making it possible to obtain a functional assembly.

7. The pressure and temperature measuring device, according to claim 1, wherein the temperature-sensitive element is incorporated into a printed circuit, which extends to the electronic circuit to which it connects.

8. The pressure and temperature measuring device, according to claim 1, wherein the temperature-sensitive element is connected to electrical wires that extend to the electronic circuit to which they connect.

* * * * *